United States Patent [19]
Bilas

[11] Patent Number: 4,463,858
[45] Date of Patent: Aug. 7, 1984

[54] REVERSIBLE PORTABLE HOIST

[76] Inventor: Michael Bilas, 2730 Columbiana-New Castle Rd., New Springfield, Ohio 44443

[21] Appl. No.: 382,967

[22] Filed: May 28, 1982

[51] Int. Cl.³ .............................................. B66C 23/26
[52] U.S. Cl. .................................. 212/176; 212/265; 280/402
[58] Field of Search ............... 212/175, 176, 179, 180, 212/181, 182, 183, 184, 185, 186, 187, 188, 244, 254, 265, 266; 280/402; 52/116, 119, 120; 254/4 R, 4 B, 4 C, 8 R, 8 B, 8 C; 248/165, 434, 558; 414/560, 561, 562, 563

[56] References Cited
U.S. PATENT DOCUMENTS

| | | | |
|---|---|---|---|
| 3,059,785 | 10/1962 | Buckeye | 254/8 R |
| 3,145,857 | 8/1964 | Hayman et al. | 254/4 R |
| 3,794,296 | 2/1974 | Hasstedt | 414/563 |
| 3,797,675 | 3/1974 | Moore | 414/560 |
| 4,069,922 | 1/1978 | Hawkins | 212/181 |

Primary Examiner—Trygve M. Blix
Assistant Examiner—Thomas J. Brahan
Attorney, Agent, or Firm—Harpman & Harpman

[57] ABSTRACT

A portable hoist that can be mounted in a pick up truck for lifting objects and for the lifting and towing of disabled vehicles. The hoist can be used either in or out of the truck.

3 Claims, 3 Drawing Figures

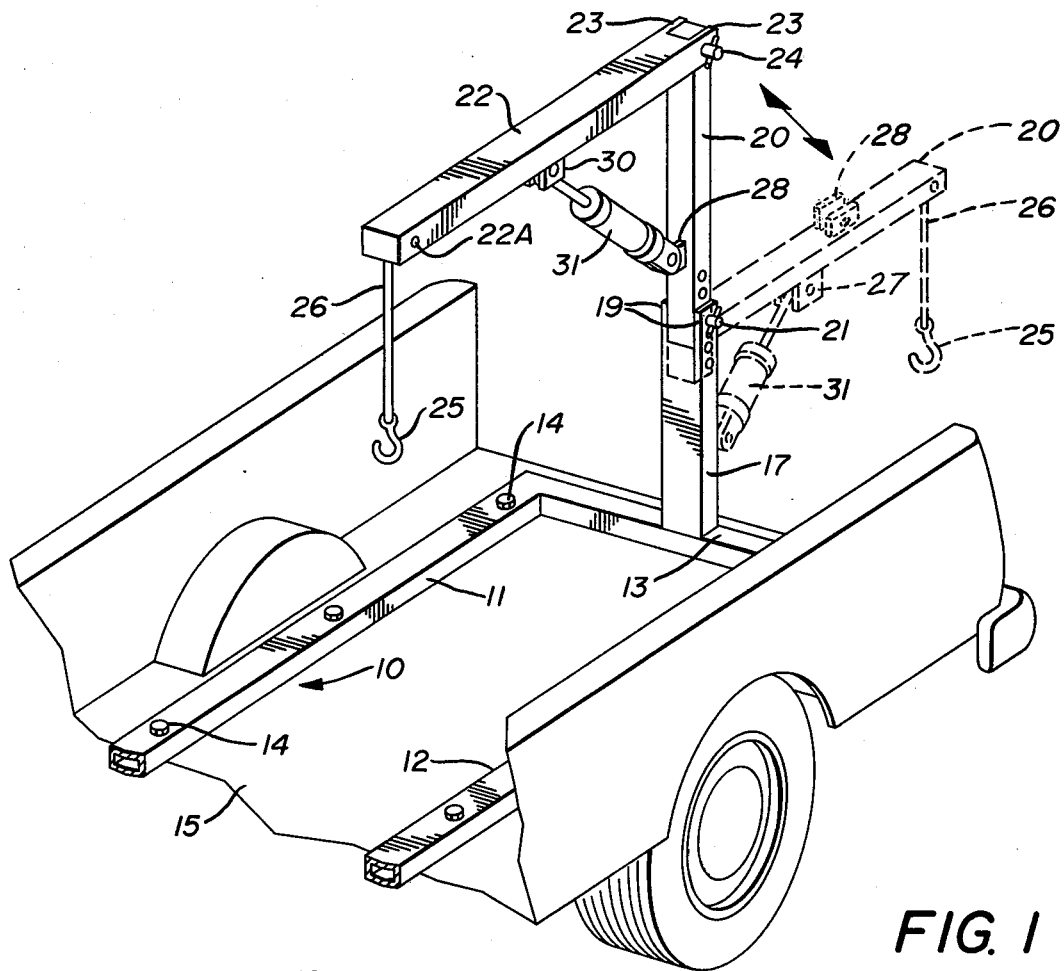
FIG. 1
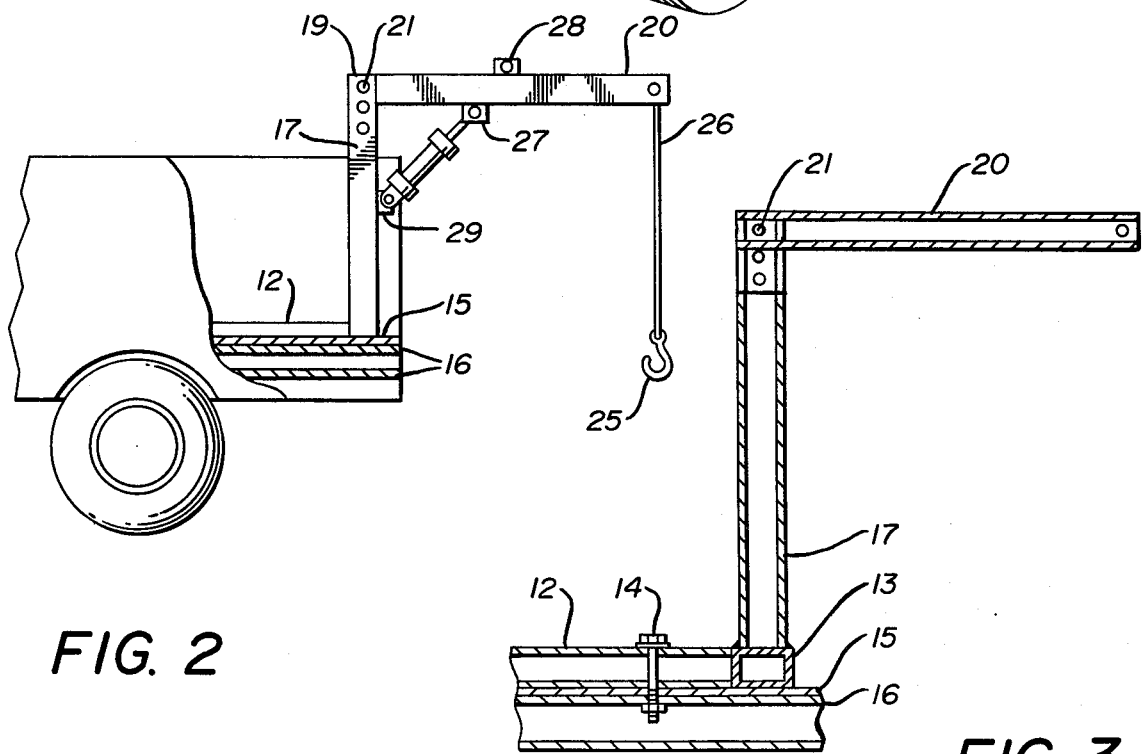
FIG. 2
FIG. 3

REVERSIBLE PORTABLE HOIST

BACKGROUND OF THE INVENTION (1) Technical Field

This invention relates to hoists or cranes capable of lifting heavy objects and moving the same. (2) Description of the Prior Art Prior art devices of this type have relied on a variety of different structures for use on the ground and some mountable in trucks. See for example U.S. Pat. Nos. 3,521,860, 2,947,425 and 4,069,922.

In U.S. Pat. No. 2,947,425 a hydraulic hoist is disclosed that is mounted in a truck bed having a vertical stationary post with a movable sleeve thereon to which is secured a piston and cylinder assembly supporting a horizontally extending arm.

In U.S. Pat. No. 3,521,860, a knock down hoist is shown which is typical of a hoist design, having a U-shaped support frame and a removable vertical support member with a pivoted arm at its uppermost point. A hydraulic piston and cylinder is secured to the support member and the arm.

In U.S. Pat. No. 4,069,922 a portable crane with a hoist is disclosed which is mounted in a truck bed. This device requires an outrigger support foot to stabilize the crane and hoist. The base is secured to the truck with the uppermost portion rotatable therein.

Applicant's device can be mounted in a truck to the truck frame and utilizes a three-piece structure allowing a portion of the main vertical support member to be used as a horizontal tow arm extending outwardly of the truck when mounting therein.

SUMMARY OF THE INVENTION

A portable hoist comprising a support frame mounted to a truck frame. A vertical two-piece support assembly telescopically extensible and pivotally secured to one another from which extends a horizontal arm used to lift heavy movable objects. The upper portions of the vertical support member can be pivoted to outwardly extending position for lifting and towing vehicles.

DESCRIPTION OF THE DRAWINGS

FIG. 1 is a perspective view of the hoist mounted in a truck;

FIG. 2 is a side elevation with portions broken away; and

FIG. 3 is a sectional view of a portion of the hoist mounted to a truck illustrating attachment to the truck frame.

DESCRIPTION OF THE PREFERRED EMBODIMENT

A portable hoist as best seen in FIGS. 1 and 2 of the drawings, comrises a U-shaped support frame 10 having spaced parallel tubular members 11 and 12 with a secondary tubular member 13 extending therebetween. The U-shaped support frame 10 has a plurality of spaced apertures through which fasteners 14 extend securing the support frame 10 to a truck bed 15 and frame 16 as best seen in FIG. 3 of the drawings.

A main vertical hoist support member 17 extends from the secondary tubular member 13 at the base of the U-shaped frame midway thereof.

The main vertical hoist support member 17 is tubular with its uppermost end having opposing spaced upstanding apertured tabs 19. A secondary vertical hoist support member 20 of a smaller outer diameter is telescopically and pivotally secured within said main vertical hoist support member 17 by a pin and clip assembly 21. A boom 22 has apertured end extensions 23 positioned on either side of the upper end of said secondary vertical hoist support member 20 and is pivotally secured thereto by a secondary pivot pin and clip assembly 24. A hook 24 is secured by a cable 26 to the free end of said boom 22 by a removable fastener 22A. Pairs of spaced apertured tabs 27, 28 and 29, the first two of which are positioned on opposite surfaces of said secondary hoist support 20 and on the main hoist support member 17 opposite the U-shaped support frame 10. An additional pair of spaced apertured tabs 30 are positioned midway on the underside of the boom 22. A hydraulic piston and cylinder assembly 31 is detachably secured between the tabs 28 and 30 supporting the boom 22 when in position as seen in FIG. 1 of the drawings. When used for lifting and towing other vehicles, the boom 22 along with the piston and cylinder assembly 31 is removed from the assembly as shown in FIG. 1 of the drawings, the secondary vertical hoist support member 20 is raised vertically and repositioned horizontally as seen in broken lines in FIG. 1 and in solid lines in FIGS. 2 and 3 of the drawings. The piston and cylinder assembly 31 is pivotally secured between the tabs 29 and 27 supporting the secondary vertical hoist support member 20, the hook 25 and cable 26 are moved from the boom 22 and attached to the other end of the secondary vertical hoist support member 20.

The portable hoist can alternately be removed from the truck bed 15 and caster wheels (not shown) inserted in the apertured support frame 10 and used in a common hoist configuration as seen in FIG. 1 of the drawings.

It will thus be seen that an improvement in a hoist has been illustrated and described that allows for the use of the hoists both in the truck and out of the truck with the added advantage of being able to tow a vehicle when mounted in a truck by the use of the two-part vertical hoist support members pivotally arranged to form a lifting and towing arm as would be required for vehicle towing.

Although but one embodiment of the present invention is illustrated and described, it will be apparent to those skilled in the art that various changes and modifications may be made herein without departing from the spirit of the invention and having thus described my invention what I claim is:

1. An improvement in a portable hoist mountable in a pickup truck and having a U-shaped frame, the improvement comprising a main vertical hoist support member with a secondary vertical hoist support member telescopically positioned therein, spaced upstanding apertured tabs on said main vertical hoist support member and a pin and clip assembly engaging said main vertical hoist support member and said secondary vertical hoist support member pivotally securing the same within said main vertical hoist support member, so as to pivot said secondary vertical hoist support member to a horizontal position, a boom and means pivotally securing said boom to said secondary vertical hoist support member, a piston and cylinder assembly, pairs of spaced apertured tabs positioned on said main vertical hoist support member and said secondary vertical hoist support member and said boom for selectively positioning said piston and cylinder assembly between said boom and said secondary vertical hoist support member and between said secondary vertical hoist support member and said main vertical hoist support member, a source of fluid pressure for said piston and cylinder assembly, a cable and hook assembly and means for attaching said cable and hook assembly to said boom and alternately to said secondary vertical hoist support member.

2. The improvement in the portable hoist of claim 1 wherein said means for attaching said cable and hook assembly to said boom comprises a removable fastener on one end of said boom.

3. The improvement in the portable hoist of claim 1 wherein said truck has a frame and apertures formed in said U-shaped frame, fasteners positioned in said apertures and engaging said frame of said truck.

* * * * *